(12) United States Patent
Chien

(10) Patent No.: US 6,523,847 B1
(45) Date of Patent: Feb. 25, 2003

(54) BICYCLE HEAD SET POSITIONING DEVICE

(75) Inventor: Jimmy Chien, Tu Chen (TW)

(73) Assignee: Jenss International Co., Ltd., Taipei Hsien (TW)

( * ) Notice: Subject to any disclaimer, the term of this patent is extended or adjusted under 35 U.S.C. 154(b) by 0 days.

(21) Appl. No.: 09/930,981

(22) Filed: Aug. 17, 2001

(51) Int. Cl.⁷ .............................................. B62M 15/00
(52) U.S. Cl. ...................................... 280/279; 280/280
(58) Field of Search .............................. 280/276, 277, 280/279, 280

(56) References Cited

U.S. PATENT DOCUMENTS 5,687,616 A  * 11/1997  Marui ........................ 280/279
5,826,898 A  * 10/1998  Fortier et al. ............... 280/276
5,927,740 A  *  7/1999  Hopey ........................ 188/306
6,224,079 B1 *  5/2001  Goring ....................... 280/279

* cited by examiner

*Primary Examiner*—Lesley D. Morris
*Assistant Examiner*—L. Lum
(74) *Attorney, Agent, or Firm*—Rosenberg, Klein & Lee

(57) ABSTRACT

A head set positioning device includes a positioning tube having a rack portion defined in an outer periphery thereof and the position tube movably extends through a crown portion of a front fork and is fixedly connected to a lower head set which is connected to a lower end of the head tube. An upper head set is fixedly connected to an upper end of the head tube and a handlebar stem is mounted to the positioning tube. An extension tube extends from the handlebar stem and a gear member is rotatably received in the extension tube and is engaged with the rack portion. The handlebar stem is pulled to press the upper head set by rotating the gear member.

4 Claims, 4 Drawing Sheets

BICYCLE HEAD SET POSITIONING DEVICE

FIELD OF THE INVENTION

The present invention relates to a head set positioning device for firmly engaging the handlebar stem, the upper head set, the head tube and the lower head set.

BACKGROUND OF THE INVENTION

A conventional bicycle head set is shown in FIG. 6 and generally includes front fork stem 10 extending through the head tube 30 of a bicycle and an upper head set 400 is mounted to a top end of the head tube 30. A handlebar stem 13 is mounted on the front fork stem 13 and a lower end of the handlebar stem 13 presses on an pressing ring 78 which positions the upper head set 400 in position by a downward force. A disk 75 is located in the handlebar stem 13 and a bolt 74 extends through the disk 75 and a first pushing member 77 threadedly mounted to the bolt 74. A spring member 70 is mounted to the bolt 74 and supported on cone-shaped surface of the first pushing member 77. Two spring washers 73 are mounted on the spring member 70 and a second cone-shaped pushing member 710 is mounted on the bolt 74 and engaged with a recessed portion 71 of the spring member 70. A spring 76 is biased between the disk 75 and the second pushing member 710. When rotating the bolt 74, the first pushing member 77 is moved upward to expand the spring member 70 and the handlebar stem 13 is moved downward to push the pressing ring 78 to position the upper head set 400. However, the conventional way to position the head set 400 requires too many parts and it takes a lot of time to assemble them.

SUMMARY OF THE INVENTION

In accordance with one aspect of the present invention, there is provided a head set positioning device which comprises a positioning tube movably extending through a crown portion of a front fork and having a rack portion defined in an outer periphery of the positioning tube. A lower head set is fixedly mounted to the positioning tube and a lower end of a head tube is fixedly connected to the lower head set. An upper head set is fixedly connected to an upper end of the head tube and the positioning tube extends through the upper head set. A handlebar stem is mounted to the positioning tube and an extension tube extends from the handlebar stem. A through hole is defined through the handlebar stem. A carry tube is received in the extension tube and located transverse to a longitudinal axis of the extension tube. An aperture is defined through the carry tube and communicates with the through hole. A gear member is rotatably received in the carry tube and engaged with the rack portion in the positioning tube via the aperture and the through hole. A holding member is engaged with the gear member.

The primary object of the present invention is to provide a head set positioning device that employs rack portion and gear member to pull the handlebar stem downward to position the upper head set and the lower head set.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
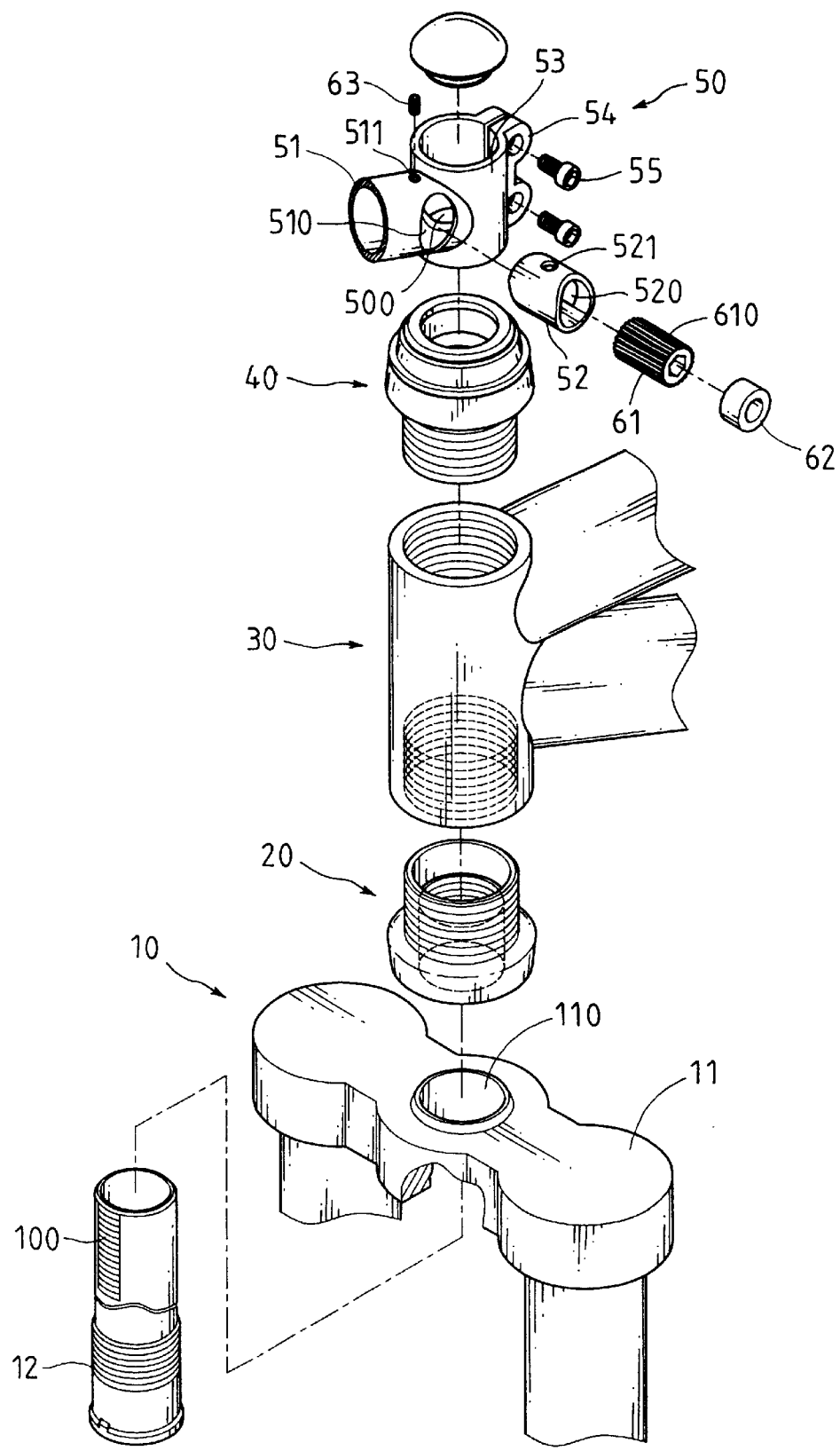
FIG. 1 is an exploded view to show a head set positioning device of the present invention.
Figure 2:
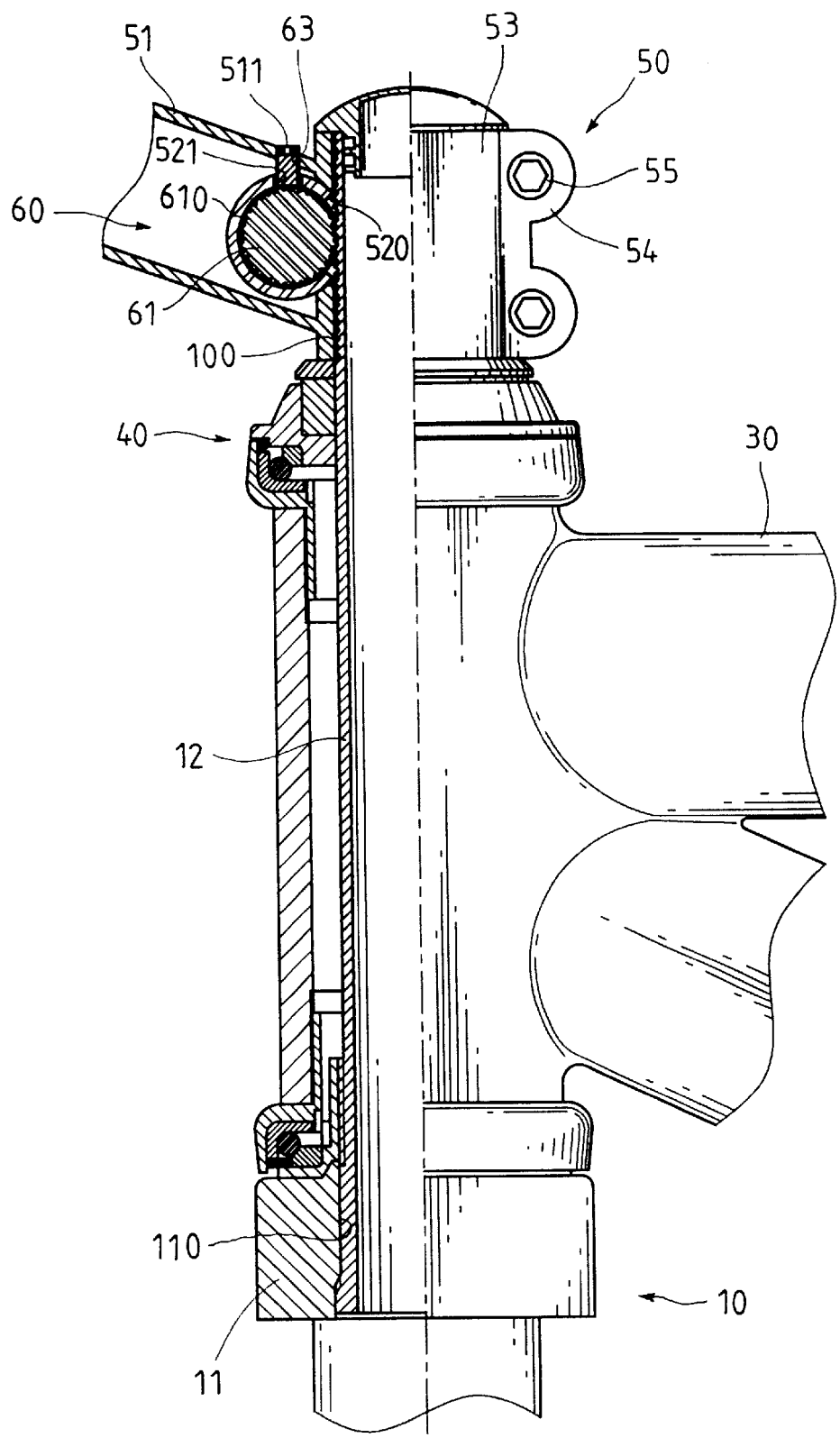
FIG. 2 is a cross sectional view to show the head set positioning device of the present invention.
Figure 3:
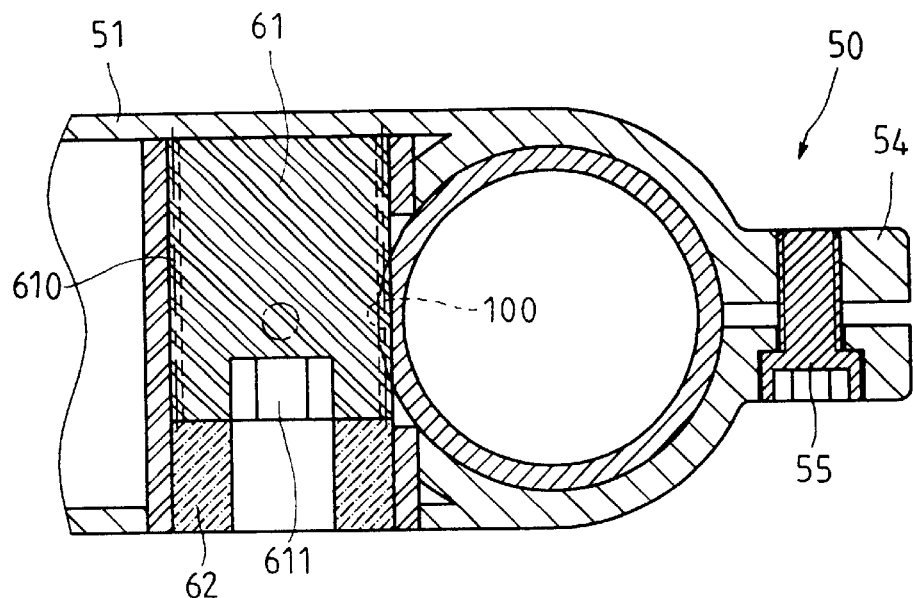
FIG. 3 is a top cross sectional view to show the engagement between the gear member and the rack portion of the positioning tube.
Figure 6:
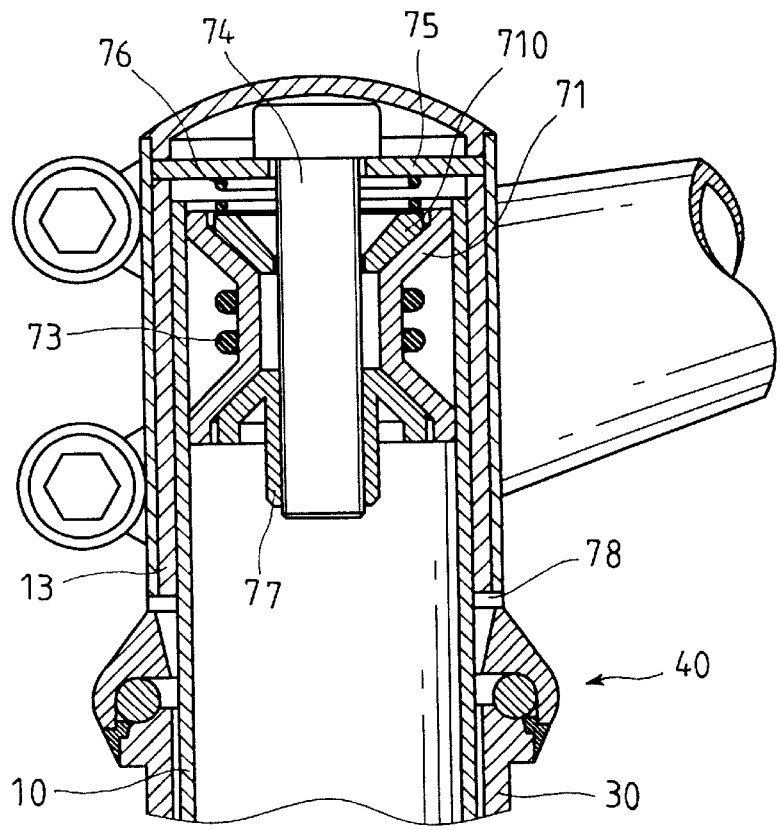
FIG. 6 is a cross sectional view to show a conventional head set positioning device of the present invention.

Referring to FIGS. 1 to 3, the head set positioning device of the present invention comprises a positioning tube 12 movably extending through a hole 110 defined through a crown portion 11 of a front fork 10. A rack portion 100 is defined in an outer periphery of the positioning tube 12 and the positioning tube 12 is a tapered tube so that it is firmly engaged with the hole 110.

A lower head set 20 is fixedly mounted to the positioning tube 12 by the respective threads of the lower head set 20 and the positioning tube 12. A lower end of a head tube 30 is fixedly connected to the lower head set 20 and an upper head set 40 is fixedly connected to an upper end of the head tube 30. The positioning tube 12 extends through the upper head set 40 and a handlebar stem 50 is mounted to the positioning tube 12. An extension tube 51 extends from the handlebar stem 50 and a through hole 500 is defined through the handlebar stem 50. A carry tube 52 is received in the extension tube 51 and located in transverse to a longitudinal axis of the extension tube 51. An aperture 520 is defined through the carry tube 52 and communicates with the through hole 500. A gear member 61 is rotatably received in the carry tube 52 and its teeth 610 are engaged with the rack portion 100 in the positioning tube 12 via the aperture 520 and the through hole 500. A holding member such as a screw 63 extends through a hole 511 defined in the extension tube 51 and a hole 521 defined through the carry tube 52 and is engaged with the gear member 61 to limit the gear member 61 from rotation. The gear member 61 has a polygonal recess 611 defined in an end thereof and a limit ring 62 is engaged with the carry tube 52 to prevent the gear member 61 from dropping from the carry tube 52. The handlebar stem 50 is securely mounted to the positioning 12 by extending bolts 55 through lugs 54 on two ends of the handlebar stem 50.

Figure 5:
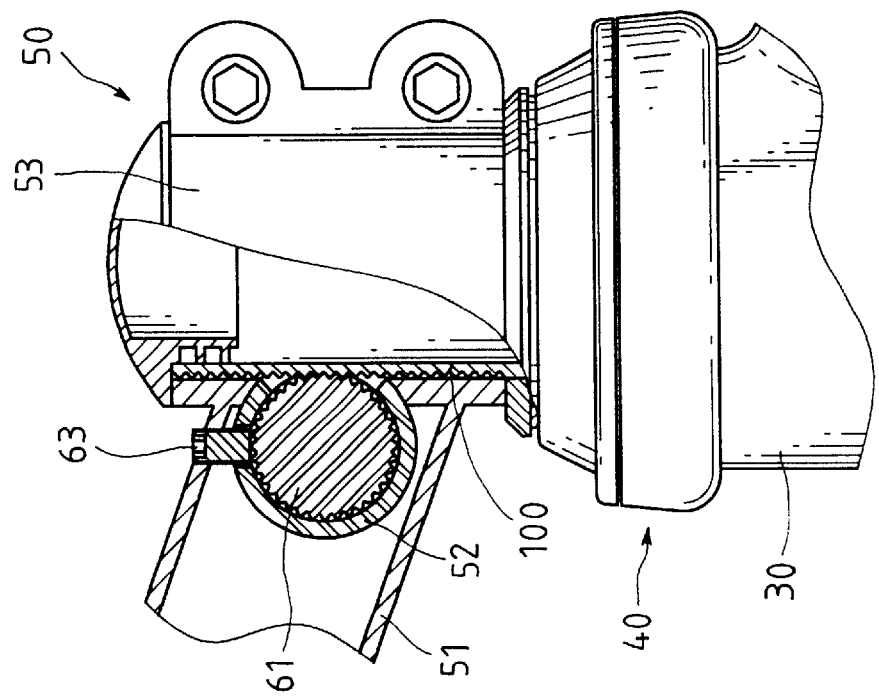
FIG. 5 is a cross sectional view to show the handlebar stem is moved downward by rotating the gear member.
Figure 4:
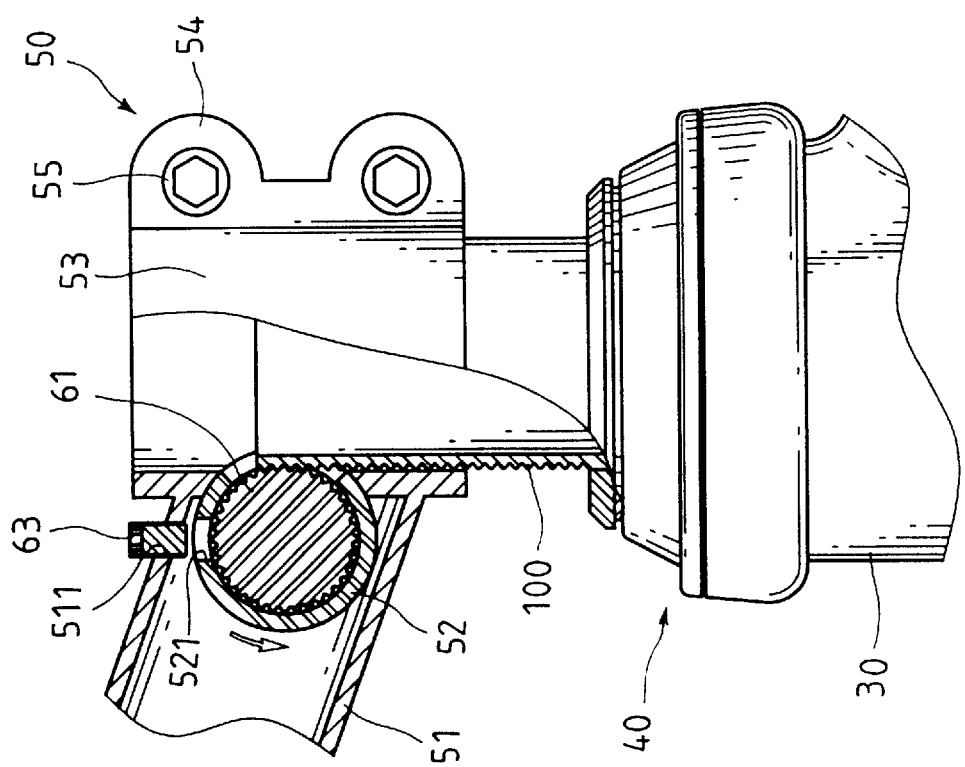
FIG. 4 is a cross sectional view to show that the screw is loosened and the gear member is rotated.

When adjusting the gear member 61, referring to FIGS. 4 and 5, the bolts 55 and the screw 63 are loosened respectively and a tool (not shown) is engaged with the polygonal recess 611 in the gear member 61 and rotates the gear member 61 counter-clockwise. The rotation of the gear member 61 drives the handlebar stem 50 downward to firmly compress on the upper head set 40 and the lower head set 20 is also pressed by the head tube 30.

While we have shown and described the embodiment in accordance with the present invention, it should be clear to those skilled in the art that further embodiments may be made without departing from the scope of the present invention.

What is claimed is:

1. A head set positioning device comprising:
   a positioning tube movably extending through a crown portion of a front fork and having a rack portion defined in an outer periphery of said positioning tube;

a lower head set fixedly mounted to said positioning tube and a lower end of a head tube fixedly connected to said lower head set, an upper head set fixedly connected to an upper end of said head tube and said positioning tube extending through said upper head set;

a handlebar stem mounted to said positioning tube and an extension tube extending from said handlebar stem, a through hole defined through said handlebar stem, a carry tube received in said extension tube and located in transverse to a longitudinal axis of said extension tube, an aperture defined through said carry tube and communicating with said through hole, and a gear member rotatably received in said carry tube and engaged with said rack portion in said positioning tube via said aperture and said through hole, a holding member engaged with said gear member.

2. The device as claimed in claim 1, wherein said holding member is a screw which extends through said extension tube and said carry tube and is engaged with said gear member.

3. The device as claimed in claim 1, wherein said gear member has a polygonal recess defined in an end thereof.

4. The device as claimed in claim 1 further comprising a limit ring engaged with the carry tube to prevent said gear member from dropping from said carry tube.

* * * * *